United States Patent [19]

Seltzer

[11] 4,409,736

[45] Oct. 18, 1983

[54] NULL SEEKING SYSTEM FOR REMOTE CENTER COMPLIANCE DEVICE

[75] Inventor: Donald S. Seltzer, Arlington, Mass.

[73] Assignee: The Charles Stark Draper Laboratory, Inc., Cambridge, Mass.

[21] Appl. No.: 288,981

[22] Filed: Jul. 31, 1981

[51] Int. Cl.³ .............................................. G01B 5/25
[52] U.S. Cl. ................................. 33/169 C; 33/174 L; 33/172 D
[58] Field of Search ............. 33/169 C, 172 D, 172 E, 33/174 L, 174 P, 180 R, 185 R; 403/53

[56] References Cited

U.S. PATENT DOCUMENTS 4,078,314 3/1978 McMurtry ........................ 33/174 L
4,203,225 5/1980 Nilsson .......................... 33/169 R X
4,283,153 8/1981 Brendamour ................. 33/169 C X
4,316,329 2/1982 Watson ............................ 33/169 C Primary Examiner—Harry N. Haroian
Attorney, Agent, or Firm—Joseph S. Iandiorio

[57] ABSTRACT

A null seeking control system for a remote center compliance (RCC) device including: detector means for sensing the position of the operator means of an RCC device relative to the fixed portion of that RCC device; a threshold circuit, responsive to the detector means, for determining for each degree of freedom whether the operator means is at a null region, offset in a first direction or offset in a second direction relative to the fixed portion of the RCC device; and a correction circuit, responsive to the threshold circuit, for providing an error correction signal to maintain the null position of the operator means relative to the fixed portion of the RCC device.

16 Claims, 6 Drawing Figures

NULL SEEKING SYSTEM FOR REMOTE CENTER COMPLIANCE DEVICE

FIELD OF INVENTION

This invention relates to a null seeking system for a remote center compliance (RCC) device.

BACKGROUND OF INVENTION

Robot devices operate to automatically assemble or mate parts and tools. They are generally used in applications in which the position and orientation of all parts are carefully controlled. In applications in which misalignments do occur, it is necessary to use either active sensing devices, which can be expensive and slow, or passive accommodation devices which, although inexpensive and fast, can have limited correction range.

Remote center compliance (RCC) devices, which are passively compliant, are available for assembly, mating and insertion tasks where it is desired to quickly and easily accommodate for relatively small misalignments. Three different types of RCC devices are disclosed in U.S. Pat. Nos. 4,098,001, 4,155,169, and application Ser. No. 140,768, filed Apr. 16, 1980, now U.S. Pat. No. 4,337,579 and incorporated herein by reference. These devices have now been instrumented, U.S. patent application Ser. Nos. 76,906 now abandoned and 76,907, filed Sept. 19, 1979, now U.S. Pat. No. 4,316,329 incorporated herein by reference, so that they are able to passively adjust to assemble misaligned parts and also indicate a measure of the misalignment.

Typically, instrumented RCC (IRCC) devices are intended to measure the position and orientation of the parts very accurately over the RCC device's entire compliant range. Such measurement IRCC devices have extremely good resolution and linearity and are complex and expensive devices. In many applications accurate measurement capability is not required, and simpler devices would suffice. A number of tasks such as placing a peg in a hole and edge following, such as for routing, grinding and arc welding, do not require such accurate measurement and correction as provided by present IRCC devices.

SUMMARY OF INVENTION

It is therefore an object of this invention to provide a simple, inexpensive control system for an instrumented remote center compliance device.

It is a further object of this invention to provide such a system which uses simple, inexpensive transducers.

It is a further object of this invention to provide such a system which is able to interface directly with various positioning devices such as commercially available robots.

The invention results from the realization that a control system for an RCC device may be made, by sensing for each degree of freedom monitored, whether the operator means of the RCC device is at a null region or offset from this null region in one or the other of two directions.

The invention features a null seeking control system for a remote center compliance device including detector means for sensing the position of the operator means of an RCC device relative to the fixed portion of that RCC device. A threshold circuit responds to the detector means to determine for each degree of freedom monitored whether the operator means is at a null region, or is offset in the first direction or is offset in a second direction relative to the fixed portion of the RCC device. A correction circuit responsive to the threshold circuit provides an error correction signal to maintain a null position of the operator means relative to the fixed portion of the RCC device. The null position may be defined differently for different applications. For insertion or centering tasks, the desired null position may be the relaxed state of the RCC. For edge-following tasks, the null position may correspond to a specific amount of displacement in a certain direction.

An RCC device may have up to six degrees of freedom, not all of which may need to be instrumented. In a preferred embodiment, the detector means includes as many detectors as there are instrumented degrees of freedom, and the detectors detect displacement. The detectors may include a pair of sensors and a differential amplifier responsive to the outputs of the pair of sensors, and the detectors themselves may be arranged in pairs. The detector pairs may be orthogonal to one another and may be arranged at a number of spaced positions about the operator means, for example, three positions. The threshold circuit includes comparator means including a comparator circuit which responds to each detector to indicate whether the operator means is offset in one of the two directions or is at a null region. The threshold circuit may also include multiple comparators or level detectors for determining whether the operator means is at a null region or is offset at one of a number of levels in one of said first and second directions. The correction circuit may include an encoder circuit for producing a binary output in response to the multi-level input from the multi-level detector and/or may include a matrix multiplier circuit for including the proper correction feedback to a robot or other positioning device.

DISCLOSURE OF PREFERRED EMBODIMENT

Other objects, features and advantages will occur from the following description of a preferred embodiment and the accompanying drawings, in which.

This invention may be accomplished by detector means for sensing the position of the operator means of an RCC device relative to the fixed portion of that RCC device. The detector includes at least one detector for each degree of freedom to be sensed and may be either a force or displacement sensing detector. Typically each detector includes a pair of sensors whose output is delivered to a differential amplifier. The detectors may be used in pairs aligned orthogonally to one another, for example, with one set of a detector pair oriented horizontally and the other set vertically. However, the invention is not limited to any of these configurations. Any sensing device will do which provides a monotonic output, which can be provided by single sensor elements as well as pairs of sensors in combination with a differential amplifier. Non-contacting sensing means are preferred. Such a detector may be constructed from a light source, such as a light-emitting diode, shining equally upon two photocells. Relative motion of the light source with respect to the photocells will cause an imbalance in the outputs of the two photocells. The two photocells may be contained in a single package, such as Litronix BPY11P-4 dual photodiodes; or even be part of a four photoelement package, such as offered by United Detector Technology, used to implement a pair of detectors. The threshold circuit which responds to the detector means to determine for each degree of freedom monitored whether the operator means is at a null region or offset in one or the other of two directions may include a comparator circuit, which provides a positive output for an offset in one direction and a negative output for an offset in the other direction, and a zero output when the operator means is at a null region. Alternatively, the threshold circuit may include multiple comparator circuits which determine not only whether the operator means is at a null region or offset in one direction or another, but in addition may indicate that the offset is at one of two or more distinct levels in either direction. The robot and robot drive unit depicted herein may be a PUMA 600 robot and controller.

Figure 1:
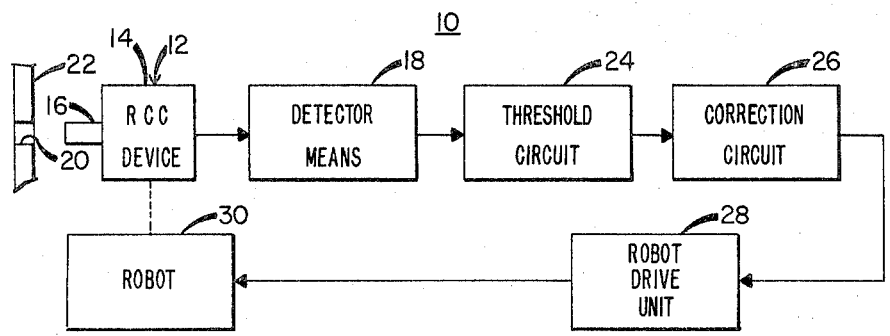
FIG. 1 is a block diagram of a null seeking control system according to this invention including a robot and robot drive unit.

There is shown in FIG. 1 a null seeking control system 10 according to this invention including an RCC device 12 having a fixed portion 14 and relatively moveable operator means 16. The relative motion between operator means 16 and the fixed portion 14 of RCC device 12 is sensed by detector means 18 as a measure of misalignment between operator means 16 and hole 20 in the workpiece 22. RCC device 12 in conjunction with detector means 18 may be considered an IRCC device, or instrumented remote center compliance device. The output from detector means 18 is delivered to threshold circuit 24, which determines for each degree of freedom monitored whether operator means 16 is at a null region or is offset in one direction or the other. That output is delivered to correction circuit 26, which develops correction signals for robot or positioning drive unit 28 enable it to drive robot or positioning unit 30 to reposition RCC device 12 so that operator means 16 is properly aligned with hole 20.

Figure 2:
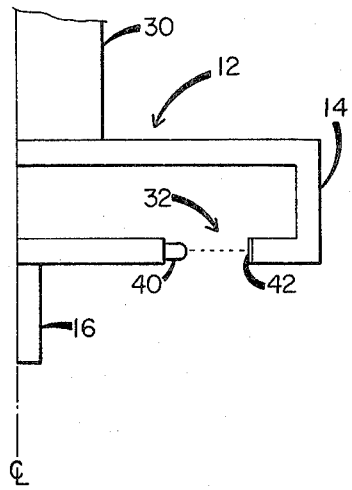
FIG. 2 is a schematic elevational view of an RCC device showing the mounting of the detector of FIG. 1.
Figure 3:
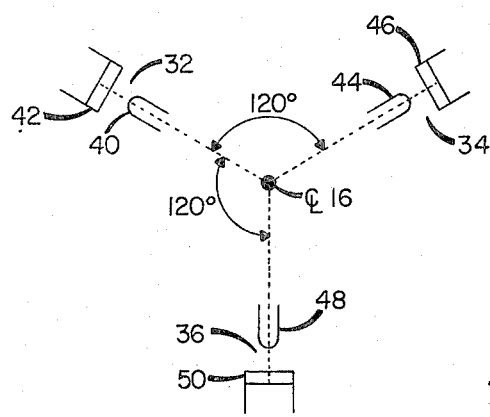
FIG. 3 is a schematic view showing the arrangement of three detectors on an RCC device according to this invention.
Figure 4:
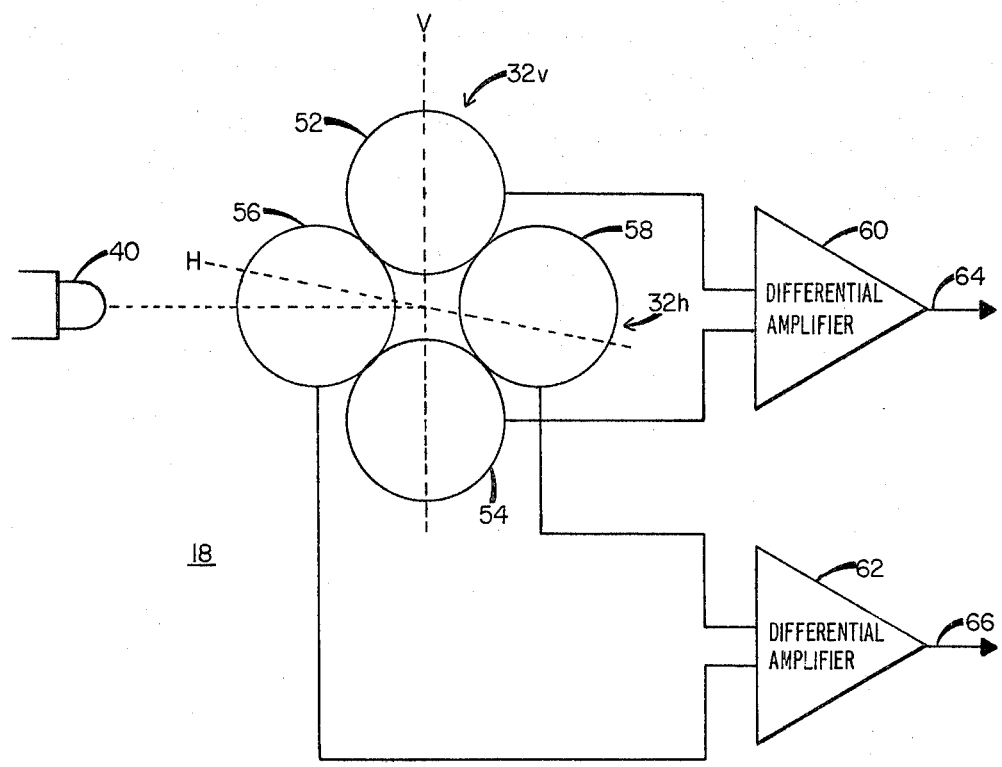
FIG. 4 is a schematic diagram of a pair of detectors including four sensors connected to two differential amplifiers.

Detector means 18 may include one or more detector devices 32, FIG. 2, for monitoring one or more degrees of freedom of operator means 16. For example, three such detector devices 32, 34, and 36 may be spaced at intervals of 120 degrees about the center line of operator means 16, FIG. 3. Detector 32 includes light source 40 and sensor means 42. Similarly, detector 34 includes light source 44 and sensor means 46; detector 36 includes light source 48 and sensor means 50. Sensor means 42 may actually comprise four sensors, all of which cooperate with single light source 40. For example, sensors 52 and 54, FIG. 4, monitor vertical motion and constitute a first detector $32v$, whose differential output is indicated by differential amplifier 60 on line 64. The pair of sensors 56 and 58 monitor horizontal motion and constitute a second detector $32h$, whose differential output is indicated by differential amplifier 62 on line 66. Each of detectors 32, 34, 36, include a vertical and a horizontal detector.

Figure 5:
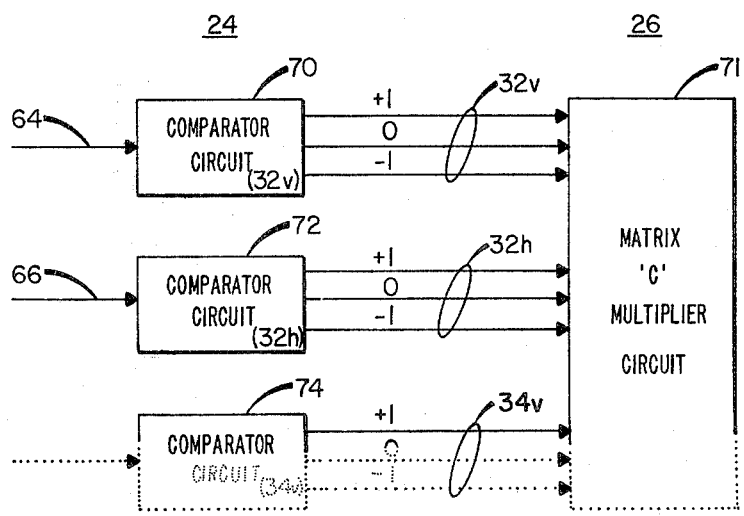
FIG. 5 is a more detailed schematic diagram of a portion of a threshold circuit and of a correction circuit according to this invention.

Threshold circuit 24 may include comparator means such as comparator circuits 70, 72, and 74, FIG. 5, one associated with the output of each differential amplifier, which in turn is associated with the output from a pair of sensors. In a six degree of freedom device, where there are six detectors or six pairs of sensors of the type shown in FIG. 4, there are six differential amplifiers and six comparator circuits of the type shown in FIG. 5. All the comparator circuits in FIG. 5 function alike. Upon receipt of the input from differential amplifier 60 on line 64, comparator circuit 70 provides a zero output if no difference is detected; provides a +1 output if a difference in a first direction is detected, and a −1 output if a difference is detected in the other direction.

The relative error between the robot position and the desired null region results in displacement of the RCC device. These displacements may be represented by a matrix W which defines the physical response of the six detectors to this displacement; that is, the displacement signals equal the matrix W times the displacement vector. If the detectors are located at a distance of one unit from the central axis, a small angle approximation of that equation may be represented as follows:

$$\begin{bmatrix} 32H \\ 34H \\ 36H \\ 32V \\ 34V \\ 36V \end{bmatrix} = \begin{bmatrix} 0 & 1 & 0 & 0 & 0 & 1 \\ .87 & -.5 & 0 & 0 & 0 & 1 \\ -.87 & -.5 & 0 & 0 & 0 & 1 \\ 0 & 0 & 1 & 0 & -1 & 0 \\ 0 & 0 & 1 & -.87 & .5 & 0 \\ 0 & 0 & 1 & .87 & .5 & 0 \end{bmatrix} \times \begin{bmatrix} x \\ y \\ z \\ \phi_x \\ \phi_y \\ \phi_z \end{bmatrix}$$

Since the detector outputs are quantized into one of three levels, 0, +1 or −1, the resulting vectors may be applied to a simple feedback matrix C which is the inverse of W, the implementation of which constitutes correction circuit 26, so that the correction signals equal the correction matrix C multiplied by the detector signals, which appear as follows:

$$\begin{bmatrix} x_1 \\ y_1 \\ z_1 \\ \phi_{x1} \\ \phi_{y1} \\ \phi_{z1} \end{bmatrix} = \begin{bmatrix} 0 & .57 & -.57 & 0 & 0 & 0 \\ .67 & -.33 & -.33 & 0 & 0 & 0 \\ 0 & 0 & 0 & .33 & .33 & .33 \\ 0 & 0 & 0 & 0 & -.57 & .57 \\ 0 & 0 & 0 & -.67 & .33 & .33 \\ .33 & .33 & .33 & 0 & 0 & 0 \end{bmatrix} \times \begin{bmatrix} 32H \\ 34H \\ 36H \\ 32V \\ 34V \\ 36V \end{bmatrix}$$

This is implemented by matrix multiplier circuit 71 in FIG. 5 which may be a set of multiplier circuits or a computer.

Figure 6:
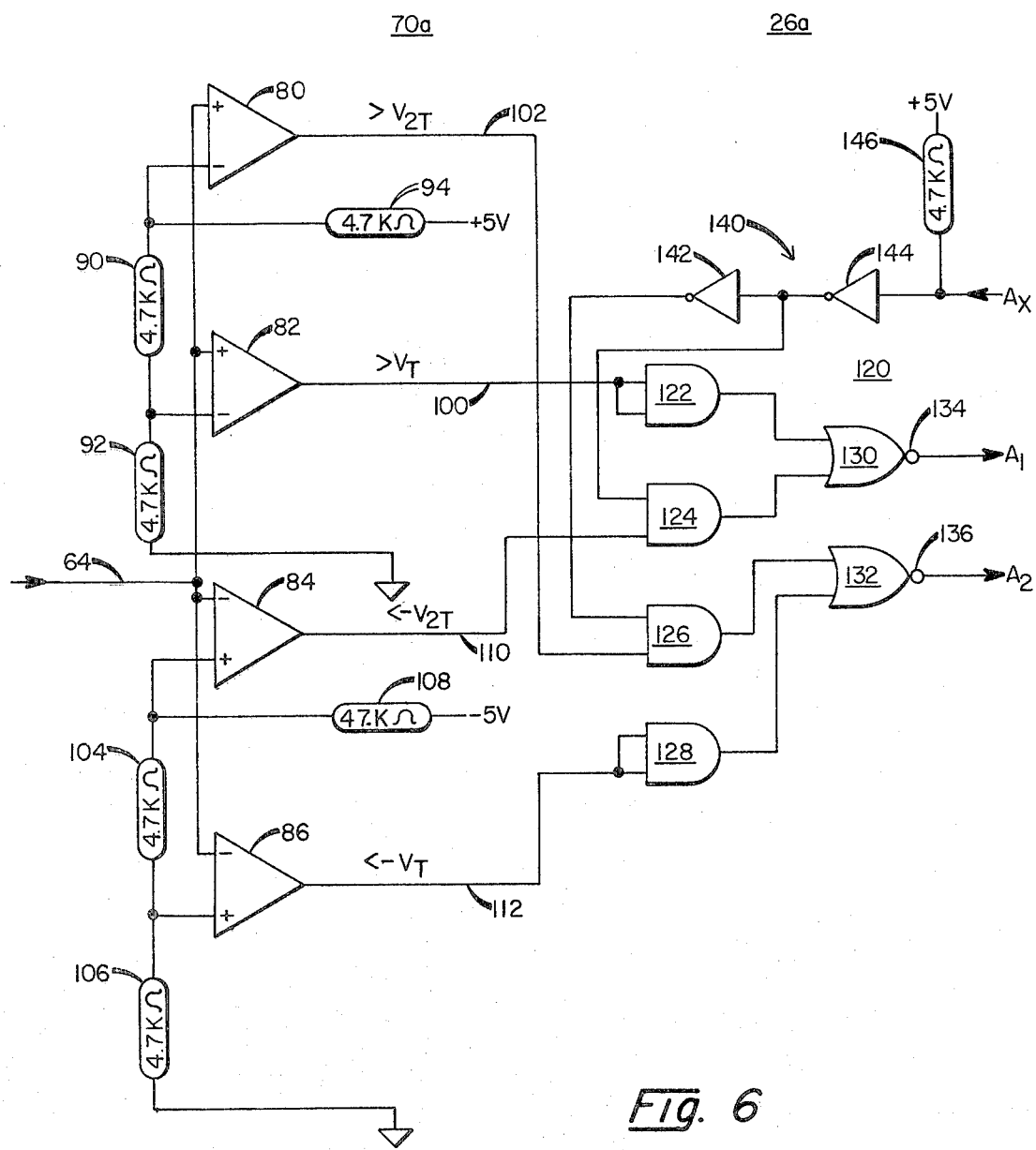
FIG. 6 is a schematic diagram of a portion of a threshold circuit according to this invention including a multi-level comparator circuit, and of a portion of the correction circuit including an encoding circuit according to this invention.

Basically, comparator circuit 70 need only indicate one of three conditions: a positive offset, a null region, or a negative offset. However, this is not a limitation of the invention. For example, an alternative form of comparator circuit 70a, FIG. 6, may include a number of comparator devices 80, 82, 84, 86. Comparators 80 and 82 are biased through resistors 90, 92, and 94 from a five-volt supply so that comparator 82 provides an output on line 100 if the input is greater than a predetermined voltage $V_T$. Comparator 80 provides an output on line 102 when its input is greater than a predetermined voltage, $V_{2T}$. Similarly, comparators 84 and 86 are biased by resistors 104, 106, and 108 through a −5 volt power supply so that comparator 84 provides an output on line 110 when its input is greater in the negative direction than $-V_{2T}$. Comparator 86 provides an output on line 12 when its input is greater in the negative direction than $-V_T$. When none of those conditions are met, a null region is indicated. Thus comparator circuit 70a is able to represent not only whether the operator means is at a null region or offset in one direction or the other, but can also indicate which of two levels of offset the operator means has reached in either of those directions.

If the five levels generated by comparator devices 80, 82, 84 and 86 are transformed to a two-bit binary code, these signals may be delivered directly to a commercially available robot drive unit such as a PUMA.

For this purpose correction circuit 26a may alternately include an encoder circuit 120, which includes four AND gates 122, 124, 126 and 128, which are paired to drive OR gates 130, 132 with inverters 134, 136 at their outputs. Encoder 120 also includes a gating circuit 140 comprised of two inverter amplifiers 142, 144, and a biasing resistor 146 connected to a +5 volt supply. The outputs A1 and A2 from inverters 134 and 136 can indicate four out of the five conditions deduced by comparator circuits 80-86.

As shown in the truth table below:

TABLE I

| $A_0$ | $A_x = H$ | | $A_x = L$ | |
|---|---|---|---|---|
| | $A_1$ | $A_2$ | $A_1$ | $A_2$ |
| $> V_{2T}$ | L | L | L | H |
| $V_T$ to $V_{2T}$ | L | H | L | H |
| $-V_T$ to $V_T$ | H | H | H | H |
| $-V_{2T}$ to $-V_T$ | H | L | H | L |
| $< -V_{2T}$ | H | L | L | L |

With this encoding scheme, the system will always be able to determine if the displacement is within the null region ($-V_T$ to $V_T$), offset in one direction ($> V_T$), or offset in the other direction ($< -V_T$). In addition, if gating input $A_x$ is high, the system can distinguish between a small offset ($V_T$ to $V_{2T}$) and larger offsets ($> V_{2T}$). If $A_x$ is low, the system can distinguish between small offsets in the other direction ($-V_{2T}$ to $-V_T$) and larger offsets in that direction ($< -V_{2T}$)

Other embodiments will occur to those skilled in the art and are within the following claims:

What is claimed is:

1. A null seeking control system for a remote center compliance device having a fixed portion and operator means movable relative thereto, comprising:
   detector means for sensing the position of the operator means of an RCC device relative to the fixed portion of that RCC device;
   a threshold circuit means responsive to said detector means for determining for at least one degree of freedom whether the operator means is at a null region, offset in a first direction or offset in a second direction relative to said fixed portion of the RCC device; and
   a correction circuit, responsive to said threshold circuit, for providing an error correction signal to maintain the null position of said operator means relative to said fixed portion of said RCC device.

2. The null seeking control system of claim 1 in which said detector means includes at least one detector for each degree of freedom of the RCC device.

3. The null seeking control system of claim 1 in which said detector means detects displacement.

4. The null seeking control system of claim 2 in which each said detector includes a pair of sensors and a differential amplifier responsive to the outputs of said pair of sensors.

5. The null seeking control system of claim 1 in which each said detector means includes a pair of sensors and a differential amplifier responsive to the outputs of said pair of sensors.

6. The null seeking control system of claim 1 in which said detectors are arranged in pairs.

7. The null seeking control system of claim 6 in which said detectors in each pair of detectors are arranged orthogonally to each other.

8. The null seeking control system of claim 6 in which said pairs of detectors are arranged at three spaced positions about said operator means.

9. The null seeking control system of claim 1 in which said threshold circuit includes comparator means.

10. The null seeking control system of claim 4 in which said threshold circuit includes comparator means.

11. The null seeking control system of claim 10 in which said comparator means includes a comparator circuit responsive to each said differential amplifier for indicating whether said operator means is offset in one of the directions or at a null region.

12. The null seeking control system of claim 1 in which said threshold circuit includes a multiple-level detector for determining whether said operator means is at the null region or is offset at one of a number of levels in one of said first and second directions.

13. The null seeking control system of claim 12 in which said correction circuit includes an encoder circuit for producing a binary output in response to the multilevel input from said level detector.

14. The null seeking control system of claim 1 in which said correction circuit includes a matrix multiplier circuit.

15. The null seeking control system of claim 1 in which said detector means detects force.

16. The null seeking control system of claim 1 in which said RCC device and detector means comprise an instrumented remote center compliance device.

* * * * *